United States Patent [19]

Adell

[11] 4,377,056
[45] Mar. 22, 1983

[54] DOOR EDGE GUARD LINER AND LINER ASSEMBLY

[75] Inventor: Robert Adell, Novi, Mich.

[73] Assignee: U.S. Product Development Company, Novi, Mich.

[21] Appl. No.: 194,749

[22] Filed: Oct. 7, 1980

[51] Int. Cl.³ .............................................. B60J 5/00
[52] U.S. Cl. ........................................ 49/462; 52/400; 52/716
[58] Field of Search ............. 52/716, 208, 400; 428/122; 49/462

[56] References Cited

U.S. PATENT DOCUMENTS

| | | | |
|---|---|---|---|
| 1,867,175 | 7/1932 | Reid | 428/122 |
| 2,102,658 | 12/1937 | Weisenburg | 428/122 |
| 2,138,374 | 11/1938 | Edwards | 52/400 |
| 2,348,937 | 5/1944 | Stahl | 52/400 |
| 2,704,688 | 3/1955 | Adell | 49/462 |
| 2,809,728 | 10/1957 | Olson | 52/400 |
| 2,840,869 | 7/1958 | Fegan | 52/208 |
| 3,099,337 | 7/1963 | Hetman | 52/400 |
| 3,340,224 | 9/1967 | Sherman et al. | 52/400 |
| 3,401,075 | 9/1968 | Jackson | 52/716 |
| 4,259,812 | 4/1981 | Adell | 49/462 |
| 4,316,348 | 2/1982 | Adell | 52/716 X |

FOREIGN PATENT DOCUMENTS 2729757  1/1979  Fed. Rep. of Germany ........ 52/716

Primary Examiner—Alfred C. Perham
Attorney, Agent, or Firm—Stephenson & Boller

[57] ABSTRACT

A liner for use with a door edge guard and the assembly of the liner with the door edge guard and the door itself. The liner is characterized by three beads, at least one of which is located within the metallic door edge guard when assembled on the door. The liner is made primarily of a plastic material, but may include one or more reinforcing wires within the beads for enhanced strength advantageous during installation of the liner and edge guard on a sheet metal door edge.

3 Claims, 3 Drawing Figures

DOOR EDGE GUARD LINER AND LINER ASSEMBLY

BACKGROUND

This invention relates to a liner for a door edge guard and to the assembly of the liner with a metallic door edge guard and with the sheet metal edges of a door itself. The liner and door edge guard assembly is particularly suitable for use on the doors of automobiles. For details of the advantages and need for liners in door edge guard assemblies, reference is made to my copending U.S. patent application Ser. No. 118,475 filed Feb. 4, 1980 and Ser. No. 132,525 filed Mar. 21, 1980, now U.S. Pat. No. 4,316,348 both of which are entitled "Door Edge Guard".

Door edge guards typically are applied to the vertical sheet metal edges of automotive doors in a self-adhering manner. The edge guards are formed in a U-shape for this purpose and are made from a metal of decorative character. Steel, either stainless or plated, is the metal usually chosen because of its strength, formability, spring characteristics and ability to accommodate doors of varying and various thicknesses. Separate fasteners or adhesive for the door edge guards generally is considered to be unacceptable by automobile manufacturers, after-market dealers and end-users of these devices. Also, edge guards that would add to the likelihood of corrosion are unsatisfactory. For this reason, there is a demand for edge guards that have an inner liner that prevents metal-to-metal contact between the edge guard and the somewhat dissimilar metal of the door itself. Usually, the inner liner is made from a vinyl or other suitable plastic material.

Plastic liners for door edge guards can be fabricated as extrusions that have a generally U-shaped configuration. The liner can then be placed directly on an automobile door and the metallic edge guard slipped over the plastic liner. Alternatively, the plastic liner can be inserted in the metallic edge guard and then these assembled elements can be made to slide over the sheet metal edge of an automobile or other door.

In the above-mentioned patent applications, there are described door edge guard assemblies that have liners. One of these patent applications, Ser. No. 132,525, describes and illustrates a door edge guard liner that has two beads of plastic at the ends of the legs of the U-shaped liner. These beads are contacted by the ends of the legs of the U-shaped and somewhat larger cross-section metallic edge guard element, which receives the plastic element prior to or after the liner being or having been positioned on the edge of a door. The beads, during this positioning on the door, aid in the installation and can improve the seal between the metallic edge guard element and the plastic liner, as well as between the plastic liner and the sheet metal received within it. These seals are of importance in limiting electrolytic corrosion that might otherwise occur in the presence within the door edge guard assembly on a door of an electrolyte, such as water or salt spray.

SUMMARY OF THE INVENTION

In accordance with the invention, a liner for use in assembly with a door edge guard and the edge of a sheet metal door has a generally U-shaped cross-section and, preferably, is made primarily from a non-metallic material, such as a plastic of the vinyl type. The liner has at least one bead which, upon assembly within a U-shaped door edge guard, makes contact with the interior of the edge guard and prevents full contact of the liner outer surface with the interior of the door edge guard. In the preferred form of the liner an additional two beads are provided, one at each end of the legs of the U-shaped liner and a thin membrane of plastic interconnects the beads at the end of each of the legs with the bead that contacts the interior surface of the metal edge guard when it is assembled with the liner. The plastic membrane is a very flexible material that is made thin enough to be readily conformible to the surface of the sheet metal of the door or to the interior surface of the edge guard. The liner bead in contact with the interior surface of the metal edge guard prevents the membrane from occupying the entire space between the edge guard and the sheet metal edge of a door received within the liner. If desired, one or more of the beads of the liner may be reinforced with a rigid material, such as a wire or stiff plastic material.

The invention may be better understood by reference to the detailed description which follows and to the drawings.

DETAILED DESCRIPTION

Figure 1:
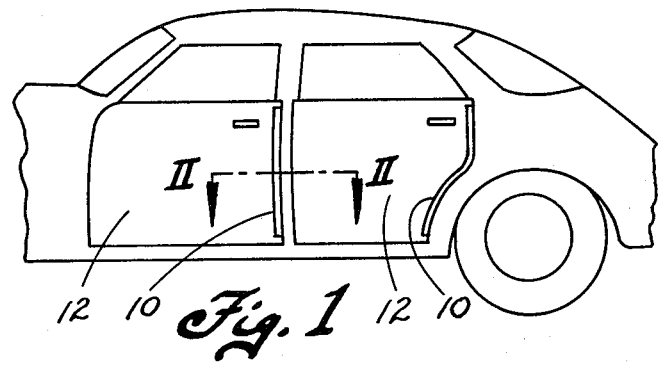
FIG. 1 is a partial elevational view of an automobile equipped with door edge guards.

With reference to the drawings, there is shown in FIG. 1 an automobile having door edge guards that are positioned on the doors. The edge guards are self-retained due to the resiliency and force of the flexed legs of the U-shaped and usually decorative metal that receives the sheet metal edges of each vehicle door. The edge guard and liner assembly 10 for one of the doors 12 can be better seen in the enlarged sectional view of FIG. 2.

Figure 2:
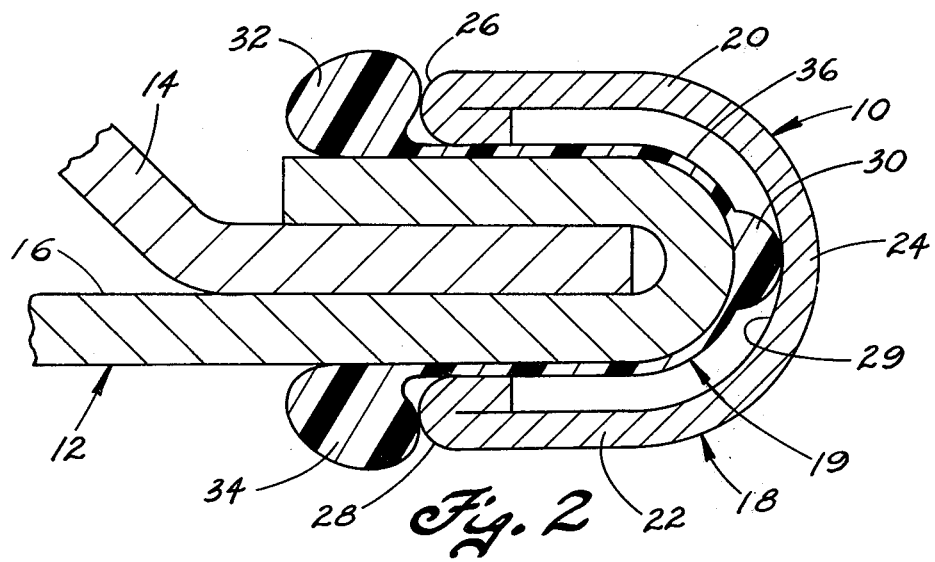
FIG. 2 is a cross-sectional view, taken along the line II—II in FIG. 1, of the sheet metal edge of the automobile door received within a door edge guard and liner.

As illustrated in FIG. 2, the door 12 has an edge formed as the hemmed flange of a door inner panel 14 and a door outer panel 16. This hemmed flange is received within the door edge guard assembly 10 comprising a door edge guard 18 and a liner 19 for the metal edge guard. The edge guard 18 and its liner 19 both are U-shaped. The liner receives the edge of the door 12 and the liner and door edge, in turn, are received by the metal edge guard 18, which preferably is made of a decorative steel and is retained on the door flange as a result of the dimensions selected for the edge guard and liner and the resilience of the metal edge guard.

The metal edge guard 18 has legs 20 and 22 that merge with the bottom portion 24 of the U-shaped cross-section. The respective ends 26 and 28 of the legs 20 and 22 are folded over upon themselves in an inward direction. Contact of the innermost surface of these folded ends with the liner 19 is achieved without the liner 19 occupying all of the space between the interior surface 29 of the metal edge guard 18 and the surface of the door edge. This result is accomplished with the bead 30 located within the U-shaped edge guard 18, in contact with its interior surface and the bead itself being a part of the liner 19. The liner 19 is nonmetallic and preferably is a plastic of the vinyl type. Ends 26 and 28 of the metal edge guard are in contact with a membrane 36 that interconnects bead 30, within the edge guard, with beads 32 and 34 exterior thereof.

The beads 32 and 34 aid in the installation of the edge guard assembly on the door edge and help form a seal against the entry of water or other potentially corrosive elements into the region within the edge guard 18. Beads 32 and 34 can be removed after installation of the edge guard 18 and liner 19. Bead 30 will remain to assure that there is space between the interior surface 29 of the metal edge guard 18 and the flange of the door 12. This space provides a channel for drainage of any electrolyte, such as water, that might enter within the edge guard when assembled on the door 12.

Figure 3:
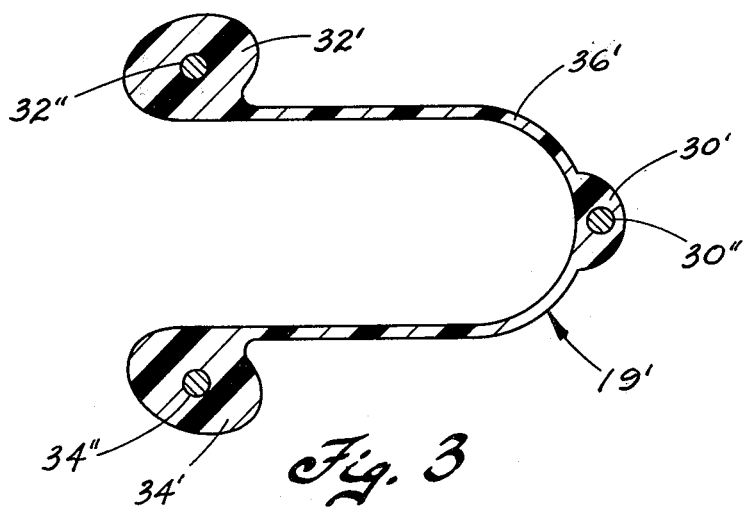
FIG. 3 is an alternative embodiment for an edge guard liner of the type illustrated in FIG. 2.

FIG. 3 illustrates an alternative embodiment of the liner. In FIG. 3 the liner 19' has a membrane 36' that interconnects reinforced bead 30' at the bottom of the U-shaped liner with similarly reinforced beads 32' and 34' at the respective ends of the legs of the liner. The reinforcement may be in any or all of the beads and may be made of wire extruded with the liner or may be a stiff plastic, fiber glass or other material satisfactory for such reinforcing application. Reinforcement of the beads may be necessary in some applications of door edge guards for a variety of reasons that may include difficult installation locations, need for installation speed or small dimensions of the components.

Based on the foregoing description, what is claimed is:

1. An improved edge guard and liner for a metal door edge guard of U-shaped cross-section, the liner being of the type comprised of a nonmetallic material intended to prevent metal-to-metal contact between the metal door edge guard and the sheet metal edge of a door received within the edge guard and the liner, the liner being adapted to be positioned between the edge guard and the door edge and being characterized by at least one bead extending along its length and a membrane connected to the bead, and in combination with a metal edge guard of U-shaped cross-section, the liner being within the edge guard and the bead being in contact with the interior surface of the edge guard, and with a sheet metal edge of a door received within the U-shaped liner, the membrane of the liner occupying less than the entire space between the interior surface of the edge guard and the door edge in the region adjacent the bead.

2. An improved liner for a metal door edge guard of U-shaped cross-section, the liner being of the type comprised of a nonmetallic material intended to prevent metal-to-metal contact between the metal door edge guard and the sheet metal edge of a door received within the edge guard and the liner, the liner being adapted to be positioned between the edge guard and the door edge and being characterized by at least one bead extending along its length and a membrane connected to the bead, and in combination with a metal edge guard of U-shaped cross-section, the liner being within the edge guard and the bead at the bottom of the U-shaped liner cross-section being in contact with the interior surface of the edge guard and the beads at the ends of the respective legs of the liner cross-section being located exterior of the edge guard, and with the sheet metal edge of a door received within the liner, the membrane of the liner occupying less than the entire space between the interior surface of the edge guard and the door edge in the regions between the beads.

3. A combination in accordance with either of claims 1 or 2 wherein the metal edge guard has the ends of the legs of its U-shaped cross-section folded over upon themselves in an inward direction, the inner surface of the folded over ends being in contact with the membrane of the liner.

* * * * *